US008638810B2

(12) United States Patent
Krishnaswamy

(10) Patent No.: US 8,638,810 B2
(45) Date of Patent: Jan. 28, 2014

(54) MULTIRADIO-DATABASE SYSTEMS AND METHODS

(75) Inventor: Dilip Krishnaswamy, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 811 days.

(21) Appl. No.: 12/109,948

(22) Filed: Apr. 25, 2008

(65) Prior Publication Data

US 2009/0268649 A1   Oct. 29, 2009

(51) Int. Cl.
*H04L 12/42* (2006.01)

(52) U.S. Cl.
USPC ............................ 370/449; 370/328; 370/465

(58) Field of Classification Search
USPC .......................................... 370/449, 328, 465
See application file for complete search history.

(56) References Cited

U.S. PATENT DOCUMENTS

| | | | | |
|---|---|---|---|---|
| 6,122,514 | A * | 9/2000 | Spaur et al. | 455/448 |
| 6,167,058 | A * | 12/2000 | Ward et al. | 370/445 |
| 6,470,378 | B1 | 10/2002 | Tracton et al. | |
| 6,981,045 | B1 | 12/2005 | Brooks | |
| 7,720,027 | B2 * | 5/2010 | Ling et al. | 370/328 |
| 7,733,819 | B2 * | 6/2010 | Lee et al. | 370/312 |
| 7,751,780 | B2 * | 7/2010 | Saidi et al. | 455/67.11 |
| 7,751,838 | B2 * | 7/2010 | Ramesh et al. | 455/502 |
| 8,135,852 | B2 * | 3/2012 | Nilsson et al. | 709/231 |
| 8,195,744 | B2 * | 6/2012 | Julia et al. | 709/205 |
| 2002/0031120 | A1 | 3/2002 | Rakib | |
| 2004/0136698 | A1 | 7/2004 | Mock | |
| 2004/0148638 | A1 | 7/2004 | Weisman et al. | |
| 2004/0148683 | A1 | 8/2004 | Lindaman | |
| 2005/0068965 | A1 * | 3/2005 | Lin et al. | 370/395.21 |
| 2005/0097595 | A1 | 5/2005 | Lipsanen et al. | |
| 2005/0170859 | A1 | 8/2005 | Koike et al. | |
| 2005/0173283 | A1 | 8/2005 | Allison | |
| 2005/0223229 | A1 * | 10/2005 | Roeder et al. | 713/171 |
| 2005/0239443 | A1 * | 10/2005 | Watanabe et al. | 455/414.1 |
| 2006/0117371 | A1 | 6/2006 | Margulis | |

(Continued)

FOREIGN PATENT DOCUMENTS

| | | |
|---|---|---|
| EP | 1237328 A2 | 9/2002 |
| EP | 2001234 A1 | 12/2008 |

(Continued)

OTHER PUBLICATIONS

Sachs ( "A Generic Link Layer for Future Generation Wireless networking"); 2003; IEEE; pp. 1-5.*

(Continued)

*Primary Examiner* — Ricky Ngo
*Assistant Examiner* — Dewanda Samuel

(57) ABSTRACT

In various embodiments, communication apparatuses and methods for providing robust communications are disclosed. For example, an exemplary apparatus for use in a communication system employing a plurality of different communication channels may include a first database of channel performance information embedded on a machine-readable and writable medium, wherein the first database includes a plurality of records with each record containing information relating to a wireless channel monitored by a Media Access Controller (MAC), input circuitry configured to receive information from a plurality of MACs monitoring their respective wireless channels such that each record of the first database contains channel performance information for a respective wireless channel, and output circuitry configured to provide the channel performance information to a plurality of applications-level executable programs running on one or more computers.

39 Claims, 11 Drawing Sheets

(56) References Cited

U.S. PATENT DOCUMENTS

| | | |
|---|---|---|
| 2006/0146823 A1 | 7/2006 | Ding |
| 2006/0168261 A1* | 7/2006 | Serval et al. ............. 709/230 |
| 2006/0190972 A1 | 8/2006 | Kasamatsu et al. |
| 2007/0055873 A1* | 3/2007 | Leone et al. ............. 713/168 |
| 2007/0072610 A1* | 3/2007 | Qiao et al. ............. 455/436 |
| 2007/0101352 A1 | 5/2007 | Rabina et al. |
| 2008/0026756 A1* | 1/2008 | Harris et al. ............. 455/436 |
| 2008/0056662 A1 | 3/2008 | Ikeda et al. |
| 2008/0080430 A1* | 4/2008 | Choi et al. ............. 370/332 |
| 2008/0161002 A1* | 7/2008 | Karimi et al. ............. 455/437 |
| 2008/0263623 A1 | 10/2008 | Hildebrand et al. |
| 2009/0268807 A1 | 10/2009 | Krishnaswamy et al. |
| 2010/0034149 A1* | 2/2010 | Lederer et al. ............. 370/329 |
| 2010/0111104 A1 | 5/2010 | Luss |
| 2011/0197234 A1 | 8/2011 | Gordon et al. |

FOREIGN PATENT DOCUMENTS

| | | | | |
|---|---|---|---|---|
| EP | WO2009007600 | * | 1/2009 | ............. H04N 5/00 |
| JP | 2000183836 A | | 6/2000 | |
| JP | 2002354439 A | | 12/2002 | |
| JP | 2003018563 A | | 1/2003 | |
| JP | 2005151443 A | | 6/2005 | |
| JP | 2006506894 A | | 2/2006 | |
| JP | 2006074269 A | | 3/2006 | |
| JP | 2006074270 A | | 3/2006 | |
| JP | 2008066897 A | | 3/2008 | |
| JP | 2008517501 A | | 5/2008 | |
| JP | 2009543412 A | | 12/2009 | |
| KR | 20090006587 A | | 1/2009 | |
| WO | WO9829975 A2 | | 7/1998 | |
| WO | WO2009007600 | | 1/2009 | |

OTHER PUBLICATIONS

Dimou et al. (Generic Link Layer, A Solution for MultiradioTransmission Diversity in Communication Network Beyond 3G); 2005; IEEE; pp. 1-5.*

International Search Report & Written Opinion—PCT/US2009/052498, International Search Authority—European Patent Office—Apr. 19, 2010.

International Search Report and Written Opinion—PCT/US2009/041710, International Searching Authority—European Patent Office, Aug. 24, 2010.

Schierl T et al: "Mobile Video Transmission Using Scalable Video Coding" IEEE Transactions on Circuits and Systems for Video Technology, IEEE Service Center, Piscataway, NJ, US LNKDDOI: 10.1109/TCSVT.2007.905528, vol. 17, No. 9, Sep. 1, 2007, pp. 1204-1217, XP011193018 ISSN: 1051-8215 the whole document.

Sigle, R (Alcatel): "MRA-Architecture, Mobile and Wireless Systems beyond 3G", Feb. 17, 2005, Document IST-2002-507134-AN/WP2/D02, XP002337899.

Taiwan Search Report—TW098113927—TIPO—Jul. 26, 2012.
Taiwan Search Report—TW098125924—TIPO—Aug. 9, 2012.

* cited by examiner

MULTIRADIO-DATABASE SYSTEMS AND METHODS

BACKGROUND

I. Field

This disclosure relates to wireless communication. More particularly, this disclosure relates to methods and systems for monitoring wireless channels.

II. Background

The evolution of mobile telephone technology has produced a number of advancements that have little to do with traditional telephony, but are now considered standard components for most cellular telephones. For example, modern cellular phones are capable of sending and receiving text messages, accessing the internet and displaying multimedia files.

One particular service now available to cellular telephones (and similarly enabled devices) is the ability to wirelessly receive and then play music, movies, music videos and television programming. The content for these services are typically sent across special high-capacity Digital Video Broadcasting (DVB)/Forward Link Only (FLO) wireless networks, such as Qualcomm's MediaFLO® system.

As more and more such disparate wireless systems are integrated into common devices and the variety of services expands, the need to monitor and coordinate the various wireless channels associated with the wireless systems may also increase. For example, if the same DVB information is available to a cellular device via two different wireless channels, it may be advantageous to quickly and easily select the best wireless channel based on a large variety of performance aspects of each wireless channel.

Accordingly, it may be desirable to develop new technologies that can expand the ability of cellular telephones and other systems having multiple wireless interfaces to more easily monitor those wireless channels available to them.

SUMMARY

Various aspects and embodiments of the invention are described in further detail below.

In a first series of embodiments, apparatus for passing information from a Media Access Controller (MAC) level to an applications level without requiring the use of intermediate level devices includes a first database of channel performance information embedded on a machine-readable and writable medium, wherein the first database includes a plurality of records with each record containing information relating to a wireless channel monitored by one or more MACs, input circuitry configured to receive information from the one or more MACs monitoring their respective wireless channels such that each record of the first database contains channel performance information for a respective wireless channel, output circuitry configured to provide the channel performance information to a plurality of applications-level executable programs running on one or more computers, and a security device that protects the first database from access by at least one unauthorized applications-level executable program In another series of embodiments, apparatus for passing information from a Media Access Controller (MAC) level to an applications level without requiring the use of intermediate level devices includes a storing means for storing a first database of channel performance information, wherein the first database includes a plurality of records with each record containing information relating to a wireless channel monitored by one or more MACs, an input means for receiving information from the one or more MACs monitoring their respective wireless channels such that each record of the first database contains channel performance information for a respective wireless channel, an output means for providing the channel performance information to a plurality of applications-level executable programs running on one or more computers, and a security means for protecting the storing means from access by at least one unauthorized applications-level executable program.

In yet another series of embodiments, a method for use in a communication system employing a plurality of different communication channels includes establishing a first database of channel performance information, wherein the first database includes a plurality of records with each record containing information relating to a wireless channel monitored by a Media Access Controller (MAC), receiving information from a plurality of MACs monitoring their respective wireless channels such that each record of the first database contains channel performance information for a respective wireless channel, and providing the channel performance information to a plurality of applications-level executable programs running on one or more computers while also protecting the first database from access by at least one unauthorized applications-level executable program.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

For the purpose of example, the present disclosure is depicted as being implemented in a cellular telephone. However, it is to be appreciated that the methods and systems disclosed below may relate to both mobile and non-mobile systems including mobile phones, PDAs and lap-top PCs, as well as any number of specially equipped/modified music players (e.g., a modified Apple iPOD®), video players, multimedia players, televisions (both stationary, portable and/or installed in a vehicle), electronic game systems, digital cameras and video camcorders.

Also, for the purpose of this disclosure, a Forward Link Only (FLO) system may be characterized as a type of Digital Video Broadcasting (DVB) system used to transport bundled media to an end device, such as a suitably enabled cellular phone capable of playing the media streams. For FLO and other DVB systems, media delivery is made without the benefit of re-transmitting packets of data that are unsuccessfully received by the end devices as is generally done on systems using TCP/IP protocols or on DVD players, which may be made to re-read various sectors of an optical disk.

While a generic DVB media delivery system is described herein for simplicity of explanation, the methods and systems may be applied to any number of DVB standards that are either in effect or are at various stages of development, including Europe's DVB-H standard, Japan's ISDB-T standard, Korea's digital audio broadcasting (DAB)-based Terrestrial-DMB and Satellite-DMB standards, China's DTV-M standard, Terrestrial-Mobile Multimedia Broadcasting (T-MMB) and Satellite and terrestrial interaction multimedia (STiMi) standards, the Advanced Television Systems Committee (ATSC) standard(s), the third generation partnership project Multimedia Broadcast/Multicast Services (3GPP MBMS) or Broadcast/Multicast Service (3GPP2 BCMCS) standards. Still further, the methods and systems may be applied to emerging standards, such as the MediaFLO® standard proposed by Qualcomm, Inc. of San Diego, Calif.

Figure 1:
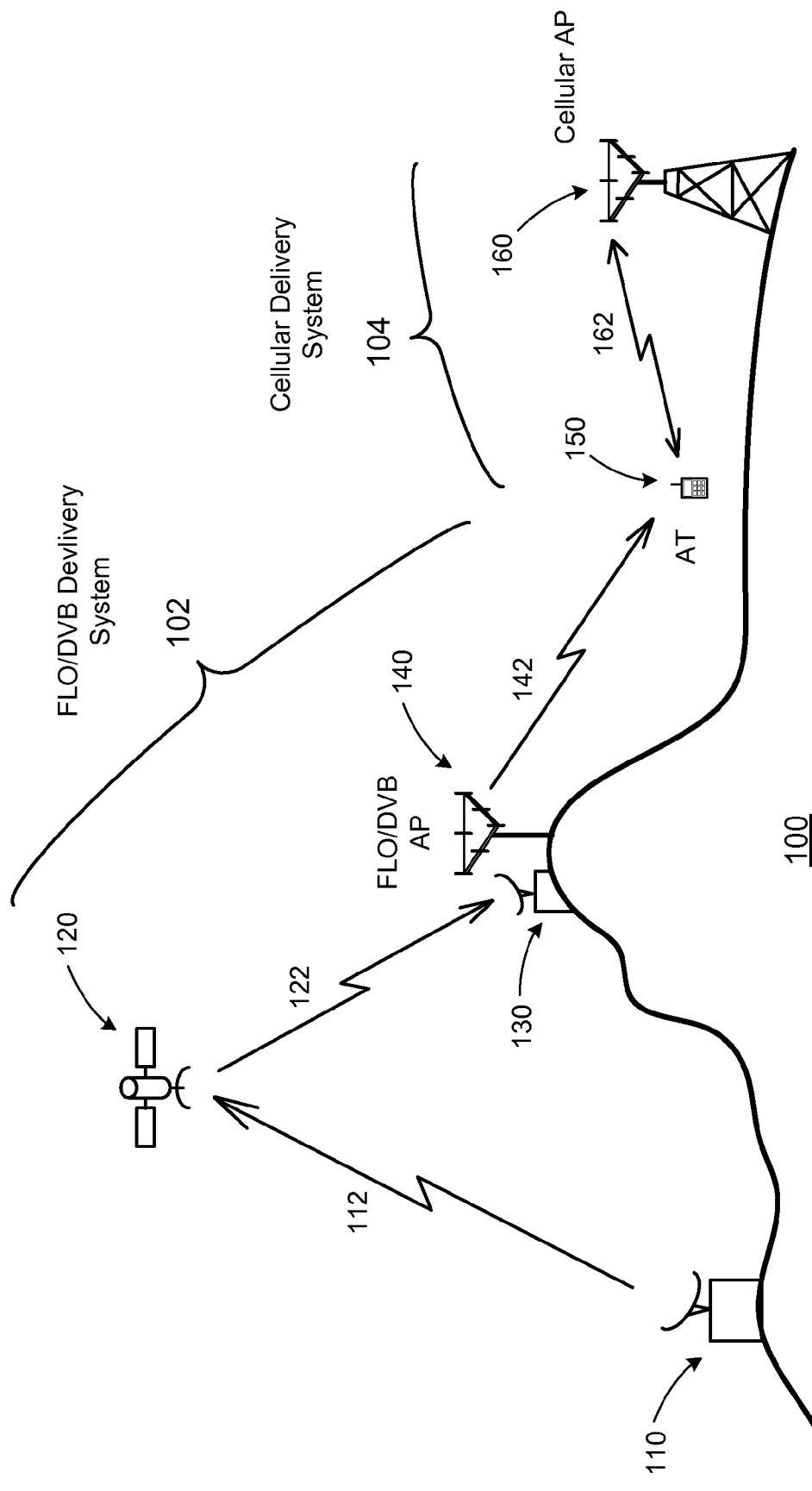
FIG. 1 depicts an exemplary communication system capable of both cellular communications and Forward Link Only (FLO) media delivery.

FIG. 1 depicts an exemplary communication system 100 capable of both cellular communication and DVB/FLO media delivery. As shown in FIG. 1, the exemplary communication system 100 includes a first cellular telephone 150 serviced by two communications systems including: (1) a DVB/FLO media delivery system 102, and (2) a cellular communication system 104.

The exemplary DVB/FLO media delivery system 102 includes a ground-based data source 110, a first satellite 120, a first ground-based DVB/FLO receiver 130, a local DVB/FLO transmission access point 140 and the first cellular telephone 150.

The exemplary cellular communication system 104 includes a local cellular access point 160 attached to a more expansive network of other cellular access points (not shown) via backhaul connections (also not shown).

In operation, various media streams, such as television programming, radio programming and movies, may be appropriately formatted, compressed, bundled and error-coded as may be found necessary or beneficial for a particular DVB standard either at the ground-based data source 110 or by another system in contact with the ground-based data source 110. The ground-based data source 110 may then transmit the resultant DVB/FLO content to the first satellite 120 via wireless channel 112. In turn, the first satellite 120 may rebroadcast the received DVB/FLO content to a number of other devices, including the ground-based DVB/FLO receiver 130 via wireless channel 122. The ground-based DVB/FLO receiver 130 may then provide the DVB/FLO content to the DVB/FLO transmission access point 140, which in turn may re-broadcast the DVB/FLO content to the first cellular telephone 150 and other devices.

Once received by the first cellular telephone 150, the various media streams embedded in the DVB/FLO content may be extracted so as to be played by the first cellular telephone 150 and/or advantageously forwarded to any number of other devices using a number of novel processes as will be further described below.

While the example of FIG. 1 shows but a single respective data path each for both media delivery and cellular services, it should be appreciated that practical/deployed embodiments of both the DVB/FLO media delivery system 102 and a cellular communication system 104 may include redundant systems with each systems having multiple DVB/FLO access points, multiple intermediate satellite channels and possibly direct satellite feeds.

For example, the exemplary cellular communication system 104 may include four or five cellular access points actively communicating with the first cellular telephone 150 with a first cellular access point transmitting payload data to the cellular telephone and two other cellular access points receiving payload data from the first cellular telephone 150. Similarly, the exemplary DVB/FLO media delivery system 102 may be complemented by multiple DVB/FLO transmission access points each receiving media content from satellite 120 and re-broadcasting the media content across overlapping geographic regions, while redundant information may be provided separately to the first cellular telephone 150 directly from a separate DVB/FLO-enabled satellite.

Given the means of DVB/FLO content distribution, it should be appreciated that retransmission of any portion of DVB/FLO content based on erroneous reception by any of possibly millions of receiving devices can be impractical, especially in light of the high data rates and onerous real-time processing that might be required for acceptable consumer enjoyment.

Figure 2:
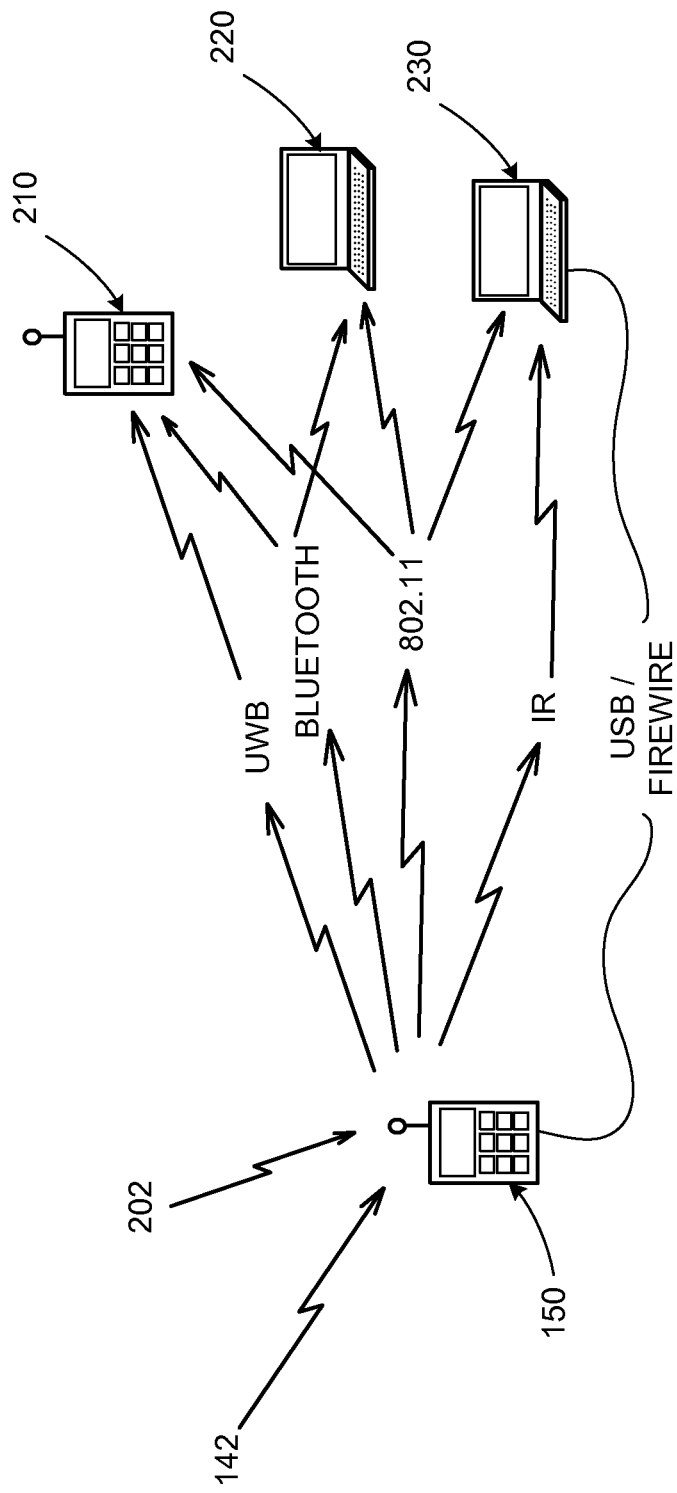
FIG. 2 depicts the cellular telephone of FIG. 1 forwarding media signals to other devices via a variety of communications channels.

As mentioned above, DVB/FLO content received by the first cellular telephone 150 may be advantageously forwarded to other devices in an array of novel manners. FIG. 2 depicts the first cellular telephone 150 of FIG. 1 forwarding media content to a number of receiving devices, including a cellular telephone 210 and personal computers 220 and 230. As depicted in FIG. 2, a variety of communications channels may connect the first cellular telephone and the receiving devices 210, 220 and 230 including an Ultra-Wide Band (UWB) channel, a Bluetooth channel, an 802.22 channel, an infrared (IR) channel and a Universal Serial Bus (USB) and/or a Firewire (e.g., IEEE 1394) channel. However, it should be appreciated that such communication channels may take any number of other forms including ZigBee (802.15) channels, ATSC channels, Wibree channels, Wireless HD channels, Wireless USB channels and so on.

Additionally, while the exemplary receiving devices 210, 220 and 230 are shown as a cellular telephone 210 and personal computers 220 and 230, in various embodiments receiving devices may range in form to include any number of devices such as mobile phones, PDAs, PCs, specially equipped/modified music players, video players, multimedia players, televisions, electronic game systems, digital cameras, video camcorders and so on.

In operation, as DVB/FLO content is received by the first cellular telephone 150 via wireless channel 142, the first cellular telephone 150 may play any particular media stream embedded in the DVB/FLO content directly and/or forward one or more media streams (or even the entire DVB/FLO content) to any or all of devices 210, 220 and 230.

In a number of embodiments, a DVB/FLO content forwarding channel may be automatically selected based on the underlying technology having the highest data transfer capacity. For example, if the first cellular telephone 150 is in contact with receiving device 210 using the UWB channel (≤2 Gbits/sec), the Bluetooth channel (≤2.1 Mbits/sec) and the 802.11 channel (≤54 Mbits/sec), the first cellular telephone 150 may choose the UWB channel to forward DVB/FLO content due to its relatively large data transfer capacity.

Similarly, if the first cellular telephone 150 is required to transmit DVB/FLO content to both receiving devices 210 and 220, the first cellular telephone 150 may choose the UWB channel to forward DVB/FLO content to device 210 while choosing the Bluetooth channel for device 220, or possibly opt to use the Bluetooth channel for both receiving devices 210 and 220. That is, the first cellular telephone 150 may choose separate wireless channels to each of receiving devices 210 and 220, or choose a common wireless channel having the greatest data capacity to forward DVB/FLO content.

In yet other embodiments, a DVB/FLO content transfer channel may be determined based on (or in addition to) a predetermined list of preferences. For instance, given the example above, if first cellular telephone 150 is in contact with receiving device 210 using the UWB channel, the Bluetooth channel and the 802.11 channel, the first cellular telephone 150 may choose the Bluetooth channel should a list of preferences indicate some preference for the Bluetooth channel—or otherwise indicate that the UWB channel should never be used for receiving DVB/FLO content. Note that such a list of preferences for a particular receiving device 210, 220 or 230 may reside in either the first cellular telephone 150 or in the respective receiving device 210, 220 or 230.

As DVB/FLO content is received by the first cellular telephone 150 and forwarded to the receiving devices 210, 220 and 230, it should be appreciated that local conditions, such as proximity of the first cellular telephone 150 relative to devices 210, 220 and 230, the availability of particular wired and wireless interfaces, multi-path problems, co-channel interference and noise, may affect the quality, e.g., the data transfer capacity, of each channel.

Accordingly, in various embodiments, a wireless forwarding channel from the first cellular telephone 150 to any of the receiving devices 210, 220 and 230 may be selected based, in whole or in part, on the data capacity of the various available channels. For example, again referring to FIG. 2, if the available UWB data transmission capacity is severely crippled due to external interference from the first cellular telephone 150 to both receiving devices 210 and 220, and the Bluetooth data transmission capacity is limited to 10 Mbit/sec to receiving device 210 due to distance (i.e. low signal strength), then the first cellular telephone 150 may select the 802.11 channel to forward DVB/FLO content to one or both of the receiving devices 210 and 220.

Additional to making an initial wireless channel selection for DVB/FLO content transfer, the first cellular telephone 150 may, in a number of embodiments, dynamically change wireless channels as circumstances change. For example, assuming that the first cellular telephone 150 is transferring DVB/FLO content to receiving devices 210 and 220 using the 802.11 channel, and for whatever reason the quality or available data transfer capacity of the 802.11 channel degrades beyond a certain threshold, the first cellular telephone 150 may reconfigure to use whatever remaining wireless channel apparently provides the best performance in some respect (e.g., best available data transfer capacity or lowest channel bit-error rate), or the wireless channel that otherwise provides some other advantage under some set of circumstances, such as circumstances that involve issues of resource allocation or where some set of metrics indicates that a wireless channel representing a particular compromise is necessary or desirable.

Additional to dynamic protocol handoff and use of multicasting, it should be appreciated that the first cellular telephone 150 may use a wide variety of other optional processes to improve or optimize communication with receiving devices 210, 220 and 230. For example, the first cellular telephone 150 may change between media formatting standards, such as MPEG-2, MPEG-4, ATSC and network abstraction layer (NAL) media standards, and/or use different levels of compression and/or different levels of "information loss" for a particular video standards, e.g., MPEG-2, that may use different amounts of information loss and possibly affect picture quality.

Still further, in a number of embodiments the first cellular telephone 150 may communicate with receiving devices 210, 220 and 230 using a variety of different error-coding schemes, including different types of inner-coding and outer-coding schemes, that may vary with various external conditions, such as the quality of a particular wireless channel.

Other aspects of the first cellular telephone 150 that may be incorporated into various embodiments include the capacity of the first cellular telephone 150 to vary encryption and to provide session keys consistent with digital rights that may be associated with various streams of media.

Figure 3:
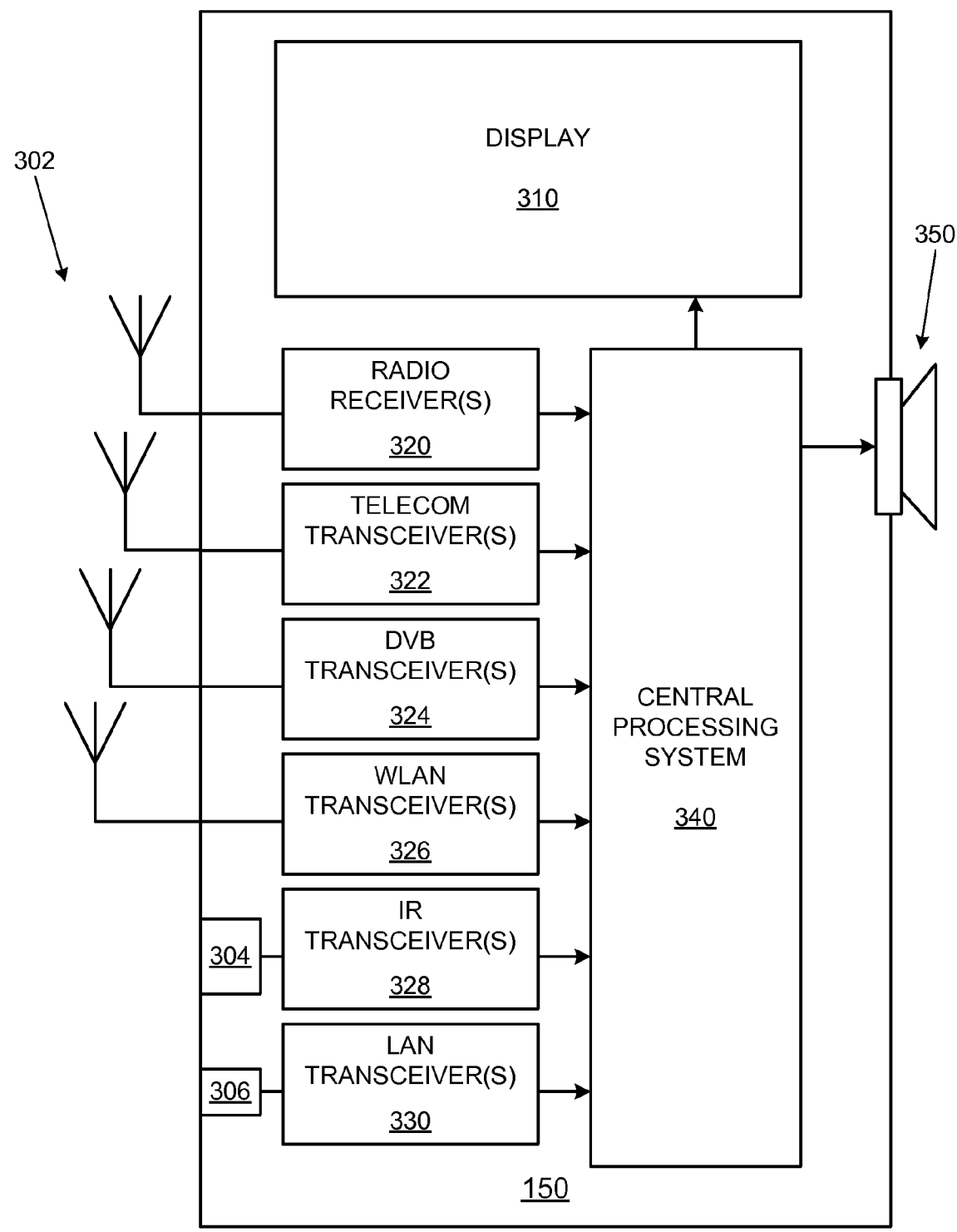
FIG. 3 shows details of the exemplary cellular telephone of FIG. 2.

FIG. 3 shows details of the exemplary first cellular telephone 150 of FIG. 2. As shown in FIG. 3, the exemplary first cellular telephone 150 includes a variety of input/output devices including a set of radio receivers 320, set of telecom (e.g., cellular) transceivers 322, a set of DVB transceivers 324, a set of wireless LAN (WLAN) (e.g., 802.11) transceivers 326, a set of infrared (IR) transceivers 328, and a set of wired (e.g., Ethernet and Firewire) LAN transceivers 330. The various input/output devices 320-330 can be serviced respectively by antennas 302, IR interface(s) 304 and electrical interface(s) 306. The exemplary first cellular telephone 150 further includes a central processing system 340, a user interface display 310 and speaker(s) 350. While there may be other interfaces available to the exemplary first cellular telephone 150, such as keypads, joysticks and the like, their presence is omitted from FIG. 3 for the sake of simplicity of explanation.

Figure 4:
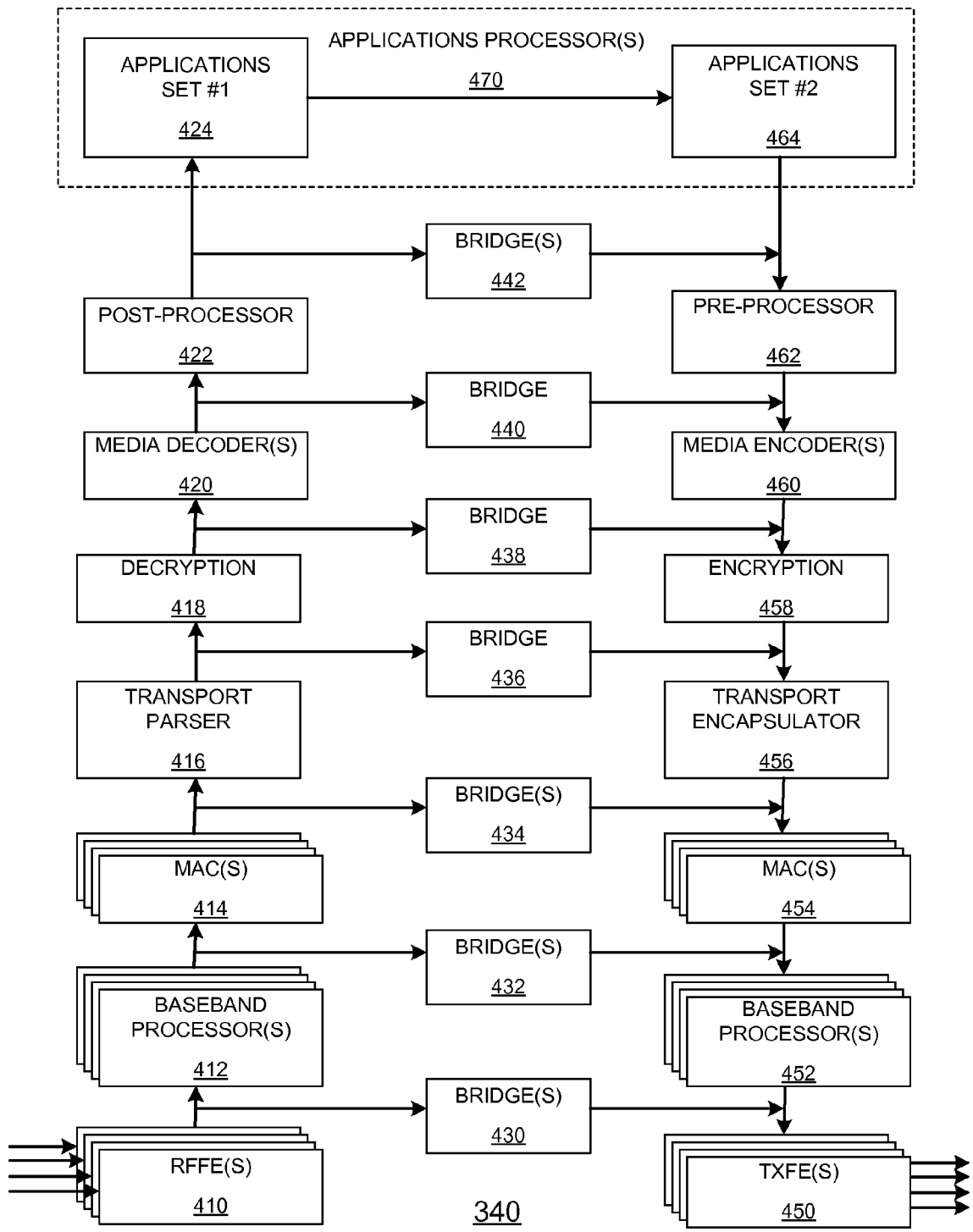
FIG. 4 shows details of the central processing system of FIG. 3.

FIG. 4 shows details of the exemplary central processing system 340 of FIG. 3. As shown in FIG. 4, the exemplary central processing system 340 includes a set of receiver RF Front ends (RFFE(S)) 410, a set of receiver baseband processors 412, a set of receiver Media Access Controllers (MACs) 414, a receiver transport parser 416, a decryption device 418, a set of media decoders 420, a post-processor 422 and a number of applications processors 470 containing a first set of applications 424 and a second set of applications 464. The exemplary central processing system 340 further includes a set of transmitter RF Front ends (TXFE(S)) 450, a set of transmitter baseband processors 452, a set of transmitter MACs 454, a transmitter transport parser 456, an encryption device 458, a set of media encoders 460, a pre-processor 462, and a series of data bridges 430-442 providing optional data paths from various receiver devices 410-422 and transmitter devices 450-462. Note that the RFEE(s) 410 and TXFE(s) 450 may include portions of the radio receivers 320 and/or other transceivers 322-330 of FIG. 3. That is, while there may be redundancy between FIG. 3 and FIG. 4 with respect to the physical (PHY) layers of various wireless and wired communication channels, the inclusion of the RFEE(s) 410 and TXFE(s) 450 in FIG. 4 is made for clarity of explanation.

In various embodiments, it should be appreciated that many of the devices, such as the transport parser 416, decryption device 418, media decoder 420 and post-processor 422, as well as their respective counterparts 456, 458, 460 and 462, may be either omitted in various embodiments or be capable of being deactivated such that data passing through such devices may be unaffected. For example, in instances where non-encrypted data is received, it mat be beneficial to disable the decryption device 418 such that data merely passes through unaffected.

Still further, in various embodiments, it should be appreciated that many of the devices, such as the media decoder 420 and media encoder 460, may be integrated into a single device and/or realized using software. Accordingly, in such situations their connecting bridge 440 may take different forms, such as a software routine or interacting software routines.

Returning to FIG. 4, the various devices 410-470 may be used to provide a large variety of communication services, such as providing telephony services, sending and receiving text messages, receiving and playing FM, AM and satellite radio, providing LAN services and providing DVB/FLO services. While explanation of the central processing system 340 will be limited primarily to DVB/FLO functionality, it should be appreciated to those of ordinary skill in the art that the various devices 410-470 may integrate any known or later develop functionality as may relate to cellular telephony, LANs and DVB/FLO services.

In operation, the RFFE(S) 410 may receive any number of wireless signals containing media content, and perform a number of PHY-related operations on the received wireless signals, including filtering, amplification and frequency translation to baseband level, to produce a number of first receiver output(s). The first receiver output(s), in turn, may be directed to one or both of the set of receiver baseband processor(s) 412 and the set of TXFE(s) via bridge 430.

When the first receiver output(s) are sent to the set of TXFE(s) 450 via bridge 430, the set of TXFE(s) 450 may be used to re-transmit the first receiver output without requiring any substantial processing of the various upper-layer devices 412-422, 452-464 and 470. For example, by using bridge 430, the first cellular telephone 150 could receive a DVB signal over television channel 53 and re-transmit the content of the DVB signal locally over television channel 56 without using anything more than a few commands at the applications layer to set the operational parameters of the RFFE(S) 410, bridge 430 and the TXFE(s) 450.

Continuing, the receiving baseband processor(s) 412 can demodulate the first receiver output(s) to produce a number of symbol or bit streams, and in various circumstances may be configured to perform various error-correction processes, such as perform an inner-coding error correction on the symbol/bit streams to produce one or more second receiver output(s). The second receiver output(s), in turn, may be directed to one or both of the set of receiving MAC(s) 414 and the set of transmitter baseband processors via bridge 432.

When any of the second receiver output(s) are sent to the transmitter baseband processors via bridge 432, the transmitter baseband processors may be used to re-transmit the second receiver output(s) without requiring any substantial processing of the various upper-layer devices 414-422, 454-464 and 470, but enable some greater amount of flexibility is gained as compared to instances where bridge 430 is used. For example, by using bridge 432, the first cellular telephone 150 could receive a DVB/FLO signal over television channel 53 and re-transmit the content of the DVB/FLO signal over another frequency, using another modulation technique and/or using a different inner-coding scheme or no inner-coding scheme at all.

Continuing, the receiving MAC(S) 414 can receive the second receiver output(s), and perform a number of processes traditionally associated with MACs, such as providing outer-coding error-detection and correction, determining whether each packet is successfully received, providing logical addressing, and monitoring various aspects of data channels, such as identifying which wireless protocols/channels are available, identifying which wireless protocols/channels are in use, identifying the available bandwidth of each channel, identifying the signal strength of each channel, identifying the bit error-rate and/or packet error-rate, identifying the average and/or maximum back-off times, identifying channel latency and identifying the average and/or the maximum number of retransmissions for a channel. The exemplary MAC(s) 414 can also provide a number of conventional and novel outer-decoding and de-interleaving operations as may be found advantageous as will be further explained below.

As the receiving MAC(s) 414 perform their assigned tasks, the MAC(s) 414 can provide one or more resulting third receiver output(s) to the receiving transport parser 416 and/or to the transmit MAC(s) 454 via bridge 434.

When any of the third receiver outputs are sent to the to the transmit MAC(s) 454 via bridge 434, the central processing system 340 may be used to re-transmit the some or all of the content of the third receiver output, but again with some amount of greater flexibility as compared to instances where bridge 432 is used. For example, by using bridge 434, the central processing system 340 could receive a DVB signal over television channel 53 and re-transmit the content of the DVB signal over another frequency while reassigning logical addresses, using a different outer-coding scheme, retransmit using a completely different wireless protocol, retransmit to multiple receiving devices, and so on as may be readily recognized by those of ordinary skill in the art.

Continuing, the receiving transport parser 416 (or "transport packet parser 416") can receive the third receiver output(s), and perform a number of processes traditionally associated with transport parsers, such as separating various media streams from one another into various individual media streams, identifying various control information and flags about individual media streams (such as titles, types of encryption used, types of media-coding used, and date/time stamps) discarding content not in use, appropriately routing content that may be in use, checking for continuity of various media streams and so on, to produce a one or more fourth receiver output(s). The various fourth receiver output(s), in turn, may be directed to one or both of the decryption device 418 and the transport encapsulator 456 via bridge 436.

When one or more fourth receiver output(s) are sent to the transport encapsulator 456 via bridge 436, the central processing system 340 can retransmit sub-portions of the originally received DVB/FLO content or mixes of the received DVB/FLO content and other content. For example, by using bridge 436, the central processing system 340 could receive a DVB/FLO signal over a highly data-intensive OFDM channel, then form a substantially lower data-intensive media stream that may be readily transmitted to a receiving device via a relatively low data-intensive channel while requiring little or no processing at the applications layer.

Continuing, the receiving decryption devices 418 can receive any or all of the fourth receiver outputs, and appropriately decrypt them (if necessary) according to any known or later developed encryption/decryption scheme and/or according to any standard of media rights and use of session keys. Decrypted media streams (or those media streams merely passing through unaffected) may then be forwarded to the media decoder(s) 420 and/or to the encryption device 458 via bridge 438.

When any of the various streams of decrypted media are sent to the encryption device 458 via bridge 438, the central processing system 340 can retransmit all or portions of the originally received DVB/FLO content, or mixes of DVB/FLO content and other content, using different encryption schemes. Additionally, new time stamps and and/or session keys may be generated such that the central processing system 340 may retransmit and monitor/manage media content consistent with any number of digital rights agreements. For example, a cellular telephone incorporating the central processing system 340 may opt out of directly displaying a movie received via a DVB signal in favor of displaying the movie on a larger screen embedded in a portable computer. Accordingly, the stream of media containing the movie of interest may be parsed by the transport parser 416, decrypted by decryption device 418, re-encrypted using encryption device 458 (again, according to a protocol consistent with the digital media rights associated with the movie) and retransmitted to the personal computer, where the personal computer may, using the appropriate session key provided by the central processing system 340, decrypt and play the movie noting that, should the viewer wish to pause the movie for some time, some form of adjustment of the movie's time stamps may be necessary.

Continuing, the media decoder(s) 420 can receive any number of media streams from the decryption device 418, and apply the appropriate media decoding operations, if necessary, to produce a one or more raw media output(s). The raw media output(s), in turn, may be directed to one or both of the set of post-processor(s) 422 and the set of encoders 460 via bridge 440.

When any of the raw media outputs are sent to the set of encoders 460 via bridge 440, the central processing system 340 may be used to re-transmit the some or all of the content of the raw media, but again with some amount of greater flexibility as a resultant transmitted output media stream may be produced to include received DVB/FLO content utilizing completely different audio-visual coding. For example, a received MPEG-2 movie having no information loss may be received and reformatted to another MPEG-2 stream having some information loss and a corresponding lower data transmission overhead with little processing required at the higher applications levels.

Continuing, the post-processor 422 can receive any number of raw media streams from the media decoder(s) 420, and appropriately apply any amount of post-processing (if necessary) according to any known or later developed processing scheme to convert raw media data into "reformatted media data." For example, post-processor 422 may receive a raw media data stream from the decoder(s) 420, then perform spatial image enhancement and increase the frame rate on the video portion of the raw media data while effectively changing the audio sampling rate from a few thousand samples-per-second to over a million samples-per-second for the benefit of a delta-sigma digital-to-analog converter. Any output of the post-processor 422 may be fed to the applications processor(s) 470 and/or provided to the pre-processor 462 via bridge 442.

When any of the post-processor's outputs are sent to the pre-processor 462 via bridge 442, the central processing system 340 may be used to re-transmit the some or all of the content of the post-processor's enhanced outputs, which can enable the processing system 340 to provide DVB/FLO content to external devices having various enhancements.

Continuing, the applications processors 470 can receive any number of media streams from the post-processor 422 to route such data to the appropriate audio device and/or video display, or possibly provide further processing, such as provide text-to-speech or speech-to-text transformations, and so on.

The applications processors 470 may also be used to receive various commands, information and flags encapsulated within the received DVB/FLO content, as well as produce various commands, information and flags that may be embedded/encapsulated in any outgoing media stream via the transport encapsulator 456. Still further, the applications processors 470 may provide those parameters, directly or indirectly, necessary to configure the various devices 410-422, 430-442 and 450-462 under their control. For example, the applications processors 470 may be able to change inner-coding at the transmitter baseband processor(s) 452 and outer-coding at the transmitter MAC(s) 454 either by some form of direct command or indirectly via commands/flags/information that may be passed down layer by layer.

Figure 5:
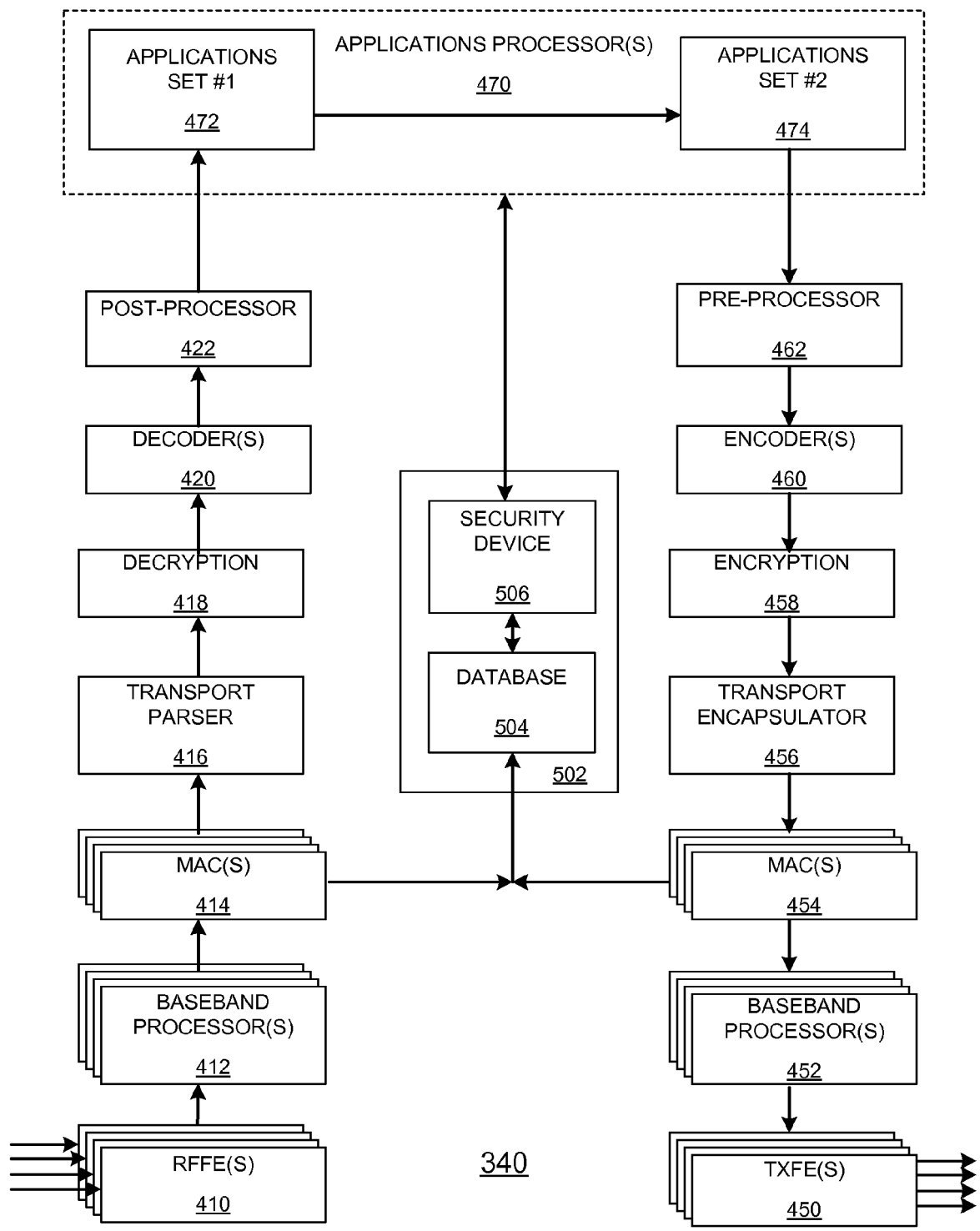
FIG. 5 shows further details of the central processing system of FIG. 3.

FIG. 5 shows further details of the exemplary central processing system 340 of FIG. 3. As shown in FIG. 5, the central processing system 340 includes a multi-radio database system 502 providing an interface between the receiving/transmitting MAC(s) 414/454 and the applications processor(s) 470, with the multi-radio database system 502 including a database 504 and a security device 506.

Figure 6:
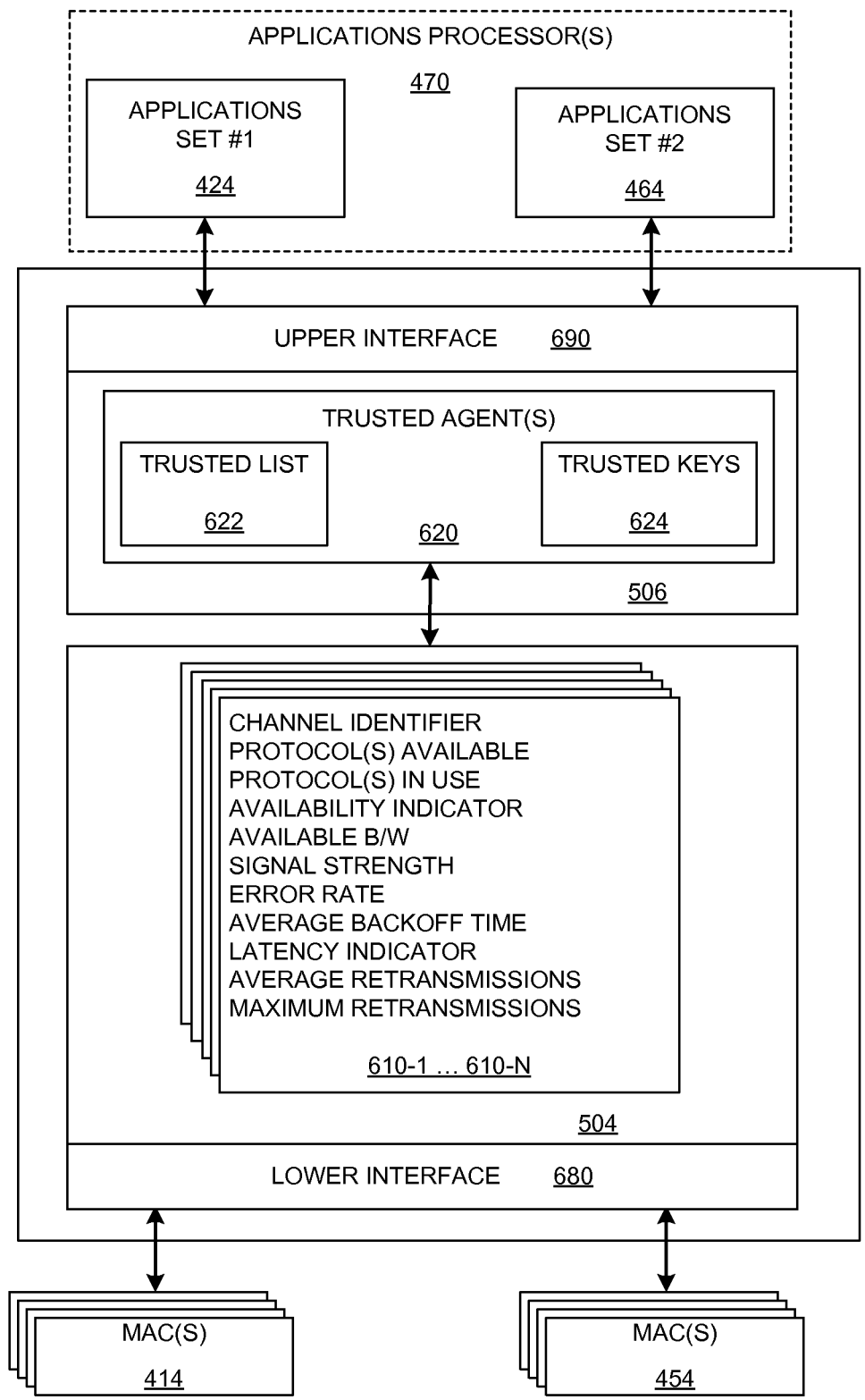
FIG. 6 shows details of the multi-radio database system of FIG. 5.

FIG. 6 shows details of the exemplary multi-radio database system 502 of FIG. 5. As shown in FIG. 6, the exemplary database 504 includes a number of records 610-1 . . . 610-N (one for each actual or potential communication channel) with each of the records 610-1 . . . 610-N including a variety of fields identifying each communication channel and various aspects of the communication channels. Also shown in FIG. 6, the exemplary security device 406 includes a set of one or more trusted agents 620 having a trusted list 622 of applications allowed to access information in the database 504 and a trusted keys device 624 for allowing/verifying access. The multi-radio database system 502 further includes an upper interface device 690 data transfer between the exemplary multi-radio database system 502 and the applications processor(s) 470, as well as a lower interface device 680 for providing data transfer between the exemplary multi-radio database system 502 and the MAC(s) 414 and 454. Various advantages of the devices of FIGS. 5 and 6 include the capacity of various high-level software applications to easily and securely access information that is monitored at the MAC level without the delay and overhead associated when such information is passed layer by layer.

It should be appreciated that, in a variety of embodiments, the database 504 and security device 506 can take any combination of software/firmware and hardware circuitry. For example, the trusted agent(s) 620 may be realized entirely using gate-level circuitry or may be realized as a purely software/firmware agent residing in a memory and executed upon by one or more processors.

In operation, it can be useful to first set up the database 504 and the security device 506. Generally, it may be useful to perform such set-up operations at a boot-up initialization operation. For situations where the database 504 and the security device 506 include gate-level hardware, this may involve setting various control registers and initializing various interfaces, such as Direct Memory Access (DMA) and interrupt controllers. For situations where the database 504 and the security device 506 include software, this may involve initially allocating the appropriate amount of memory for the database 504 and the security device 506, plus evoking the underlying software routines, i.e., software versions of the trusted agents 620.

It should be appreciated that there may be a large number of situations where applications-level programs will include "trusted" programs that should be granted access to some or all of the database 504, while other applications-level programs may pose a security risk. For example, many cellular phones may include applications-level programs, such as games, time-management software and special interfaces provided by third-party developers, that should not be granted access to the database 504 both for privacy issues and to preclude such less trustworthy programs from using resources that are in demand by the trusted programs.

Accordingly, when trusted applications-level programs are initiated, it can be useful to register those trusted applications-level programs in the trusted list 622 and/or provide trusted access keys to the trusted applications-level programs. While trusted programs may, in certain embodiments, be initialized any time, it can be useful to allow trusted programs only to be initialized during a "trusted boot" operation, that may be an independent initialization operation or perhaps part of a larger boot-operation used for power-up situations and the like.

Depending on the particular needs or design choices made, the security device 506 may allow each trusted applications-level programs to access the entire database 504 or access only a set of specific records and/or types of data. For example, it may be useful to limit a first trusted applications-level program to access records concerning an available Bluetooth channel, while limiting a second trusted applications-level program to accessing only availability and signal-strength information for a number of 802.11 wireless channels. Such access privileges, including partial access privileges, may be embedded in a trusted access key to be verified by the trusted keys device 624, or possible embedded elsewhere in the security device 506.

Continuing, in various embodiments, it may be useful for the size of the database 504 to remain static. In such situations, allocation of memory for the database 504 might only be possible during a booting/system initialization operation.

However, in a variety of other embodiments it may be useful for the size of the database 504 to change dynamically such that memory may be dynamically allocated for the database 504 as needs arise. For example, for situations where memory resources are limited, it may be beneficial not to allocate memory for the database 504 until a particular wireless communication device is on-line where after the memory may be allocated, the respective database record established and respective data fields appropriately populated.

Returning to FIG. 6, after the database 504 is adequately established, various input devices (not shown), such as DMA controllers, buffers, multi-port memories and so on, may be used to allow each of the receiver MACs 414 and transmitter MACs 416 monitoring their respective wireless channels to populate the respective records 610-1 . . . 610-N such that each record of the database 504 may contain channel identification and performance information for a respective wireless channel.

In a number of embodiments, the lower interface device 680 may use as little as a single conducting data path configured to pass a serial data stream for each of the receiver MACs 414 and transmitter MACs 416 individually, or possibly a single conducting data path for the receiver MACs 414 and transmitter MACs 416 collectively. Such narrow data paths may be especially useful when the various components of a communication system are embodied in a variety of integrated circuits and input/output pins are at a premium. For example, assuming that a first integrated circuit incorporates the receiver MACs 414 and transmitter MACs 416 and a second integrated circuit incorporates the database 504 and runs the applications-level programs, then data from the first integrated circuit may be consolidated from the MACs 414 and 454, formatted appropriately and serially transferred to the second integrated circuit, which may in turn evoke a number of interrupts and flags indicating the reception of new/updated channel information. Note that the same form of exemplary serial interface may be used for the upper interface device 6980 as well.

Continuing, as the various trusted applications-level programs attempt to access the database 504, each trusted applications-level program may first request access via the trusted agent(s) 620 (which may act as an intermediary) and present some form of software identification and/or an appropriate access key.

Assuming that the software identification satisfies some form requirement of the trusted list 622 and/or the presented access key is verified by the trusted key device 624, the trusted agent(s) 620 may pass the appropriate information to the requesting applications-level program, or otherwise enable direct access by the requesting applications-level program.

In order to increase security of the database, it may be useful for any or all of the applications-level programs to be limited to read-only access, such that the database 504 is protected from unauthorized or accidental over-writing by any applications-level executable programs. Additionally, the various MACs 414 and 454 may be precluded from reading from or writing to records 610-1 . . . 610-N that are not used to derive the respective channel performance information associated. For example, if a first MAC is responsible only for UWB communications, then it may be beneficial to preclude the first MAC from accessing those records related to Bluetooth and 802.11 channels to prevent accidental over-writing and data corruption.

Figure 7:
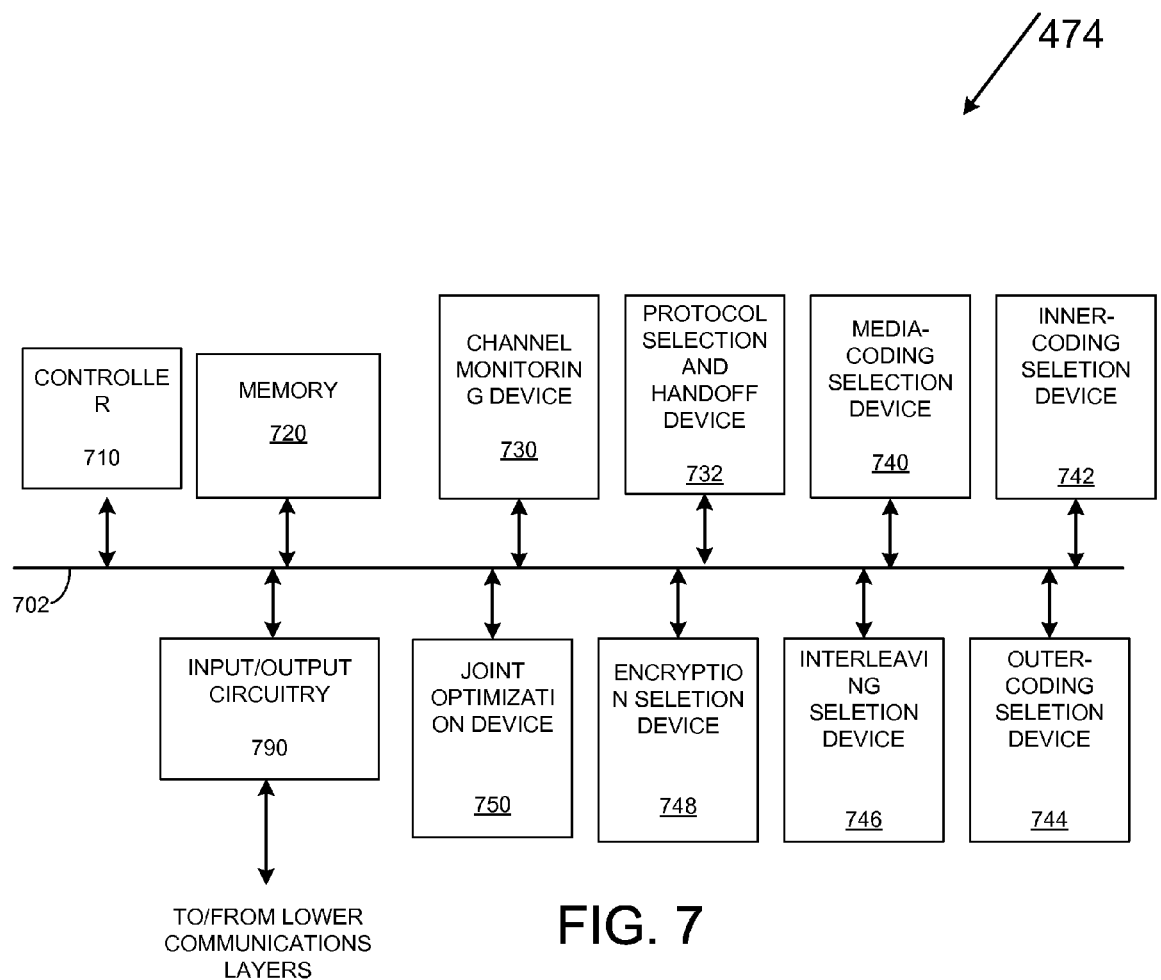
FIG. 7 depicts a portion of the applications processor(s) of FIG. 5.

FIG. 7 depicts a command processor 474 as may be found in the applications processor(s) of FIG. 5. As shown in FIG. 7, the exemplary command processor 474 includes a controller 710, a memory 720, a channel monitoring device 730, a protocol selection and handoff device 732, a media-coding selection device 740, an inner-coding selection device 742, an outer-coding selection device 744, an interleaving selection device 746, an encryption selection device 748, a joint optimization device 750 and input/output circuitry 790.

Although the exemplary command processor 474 of FIG. 7 uses a bussed architecture, it should be appreciated that any other architecture may be used as is well known to those of ordinary skill in the art. For example, in various embodiments, the various components 710-790 can take the form of separate electronic components coupled together via a series of separate busses.

Still further, in other embodiments, one or more of the various components 710-790 can take form of separate processing systems coupled together via one or more networks. Additionally, it should be appreciated that each of components 710-790 advantageously can be realized using multiple computing devices employed in a cooperative fashion.

It also should be appreciated that some of the above-listed components 710-790 can take the form of software/firmware routines residing in memory 720 and be capable of being executed by the controller 710, or even software/firmware routines residing in separate memories in separate computing systems being executed by different controllers. For example, in various embodiments it may be advantageous to put the outer-coding selection device 744 and interleaving selection device 746 in a MAC, while placing the inner-coding selection device 742 in a PHY noting that they may be made to work independently or enabled to perform some joint optimization assuming some special communication routes are established.

Further, it should be understood that the functions of any or all of components 730-790 may be accomplished using object-oriented software, thus increasing portability, software stability and a host of other advantages not available with non-object-oriented software.

In operation, the channel monitoring device 730 can receive a variety of information regarding the existence and status of any number of wired or wireless communication channels subject to control by, or otherwise associated with, the command processor 474. In various embodiments, the information in the channel monitoring device 730 may be provided by the multi-radio database system 502 of FIGS. 5 and 6, or otherwise provided in a more conventional manner, e.g., passed layer-by-layer from the various MACs or in a hybrid of the two approaches. For example, referring to FIG. 2, the channel monitoring device 730 may be populated with information regarding the UWB, Bluetooth and 802.11 devices embedded in the first cellular telephone 150 as well as any prospective wireless channels established or otherwise available to the various receiving devices 210, 220 and 230.

Returning to FIG. 7, the protocol selection and handoff device 732 may be used to select and establish wireless communication channels from the appropriate transmitter circuitry (e.g., the TXFE(s) of FIG. 4) to the desired receiving device(s). In various embodiments, such selections and supporting computations may use the information residing in the channel monitoring device 730, and in various embodiments the protocol selection and handoff device 732 may be configured to control a wide variety of hardware, such as any of the devices 410-462 of FIG. 4. For example, the protocol selection and handoff device 732 may be used to control the TXFE(s) 450, the transmitter baseband processors 452 and the transmitter MACs 454 so as to steer a particular multimedia stream to a distant receiving device using an 802.11 protocol.

Continuing, the media-coding selection device 740 may be used to select the particular media-coding format/scheme upon which multimedia is delivered to a distant receiving device. For example, assuming that a DVB/FLO content channel was available and the video content of the DVB/FLO content channel was formatted using a network abstraction layer (NAL) media format/scheme, then the media-coding selection device 740 might use the indigenous NAL scheme to forward a video stream to a distant receiving device, make adjustments within the NAL standard protocol to forward the video stream, or otherwise select an entirely different standard, such as the MPEG-2 standard, the WMV (Windows Media Video) standard, and ASF (Advanced Systems Format) standard, the ATSC (advanced television) standard, any of the Real Media standards (e.g., RM, RMVB, RAM and RA), the AVI standard, the MP4 standard, the MOV standard, the 3GP standard, the MP3 standard or any other known or later developed video format/scheme as may be found advantageous.

In various embodiments, the particular media-coding scheme used may be dependent on limitations of a targeted receiving device. For example, the targeted receiving device may be directly limited as to the number of video formats for which it contains supporting hardware or software, or may otherwise be indirectly limited to those media-coding schemes that require minimal processing due to processor limitations at the targeted receiving device.

Still further, the type of media-coding selected may be determined (in whole or in part) based upon the physical characteristics of a display screen (e.g., limitations as to spatial resolution, color resolution and/or light intensity resolution) or whether the receiving device has notable limitations as to its audio capacity, e.g., has only a single, low-quality speaker. For example, assuming that a display associated with a targeted receiving device has only a spatial resolution of 160-by-320 pixels, the media-coding selection device 740 may provide instructions and control information to a media encoder under its control to cause the media encoder to provide no more resolution that the targeted display may possible use. As may be desired in a number of embodiments, the media-coding selection device 740 also may choose the level of information loss depending on the nature of the targeted receiving device and its display.

Still further, the type of media-coding used may be limited to the processing overhead of the various devices under control of the exemplary command processor 474. For example, assuming that a majority of functions are limited to the software processing power of two embedded processors for a total of 200 Million operations per second, then the total processing for media-coding may be limited to this processing cap plus whatever processing overhead may be required by other applications, by encryption and error-coding requirements, and so on.

Additional to characteristics of a receiving device, the particular media-coding scheme used may be dependent on a number of other relevant factors, such as the wireless communication standard used between the transmitting circuitry under control of the command processor 474 and the targeted receiving device(s), a data transfer capacity of a wireless channel between the transmitting circuitry and the targeted receiving device(s), a transmission bit-error rate of the wireless channel from the transmitting circuitry to the receiving device(s), or any other aspect of a communication channel that may affect performance.

In view of the available effective data transfer capacity of a wireless channel, the media-coding scheme may be tailored based on the data transfer overhead of the media-coded stream of data. For example, assuming that a particular wireless channel is limited to ~10 Mbit/sec, then it would be impractical to use a media-coding scheme that would require more than ~10 Mbit/sec to deliver the resultant media stream.

Further, considering the data transfer overhead associated with various communications channels, such as packet headers and error-coding overhead, the appropriate media-coding scheme may be even more limited. For example, assuming that a 1/2 convolutional inner-coding and a 1/2 Reed-Solomon block outer-coding were selected for use with the media-coded stream of data due to a onerous bit-error rate of an available wireless channel, then the selected media-coding scheme may likely be no more than 2 Mbits/sec.

Given that the characteristics of wireless channels are susceptible to change, the exemplary media-coding selection device 740 may be configured to account for such changes in such a way as to allow graceful degradation or enhancement of media quality at the receiving apparatus. For example, assuming that the ~10 Mbit/sec communication channel mentioned above degrades to ~8 Mbit/sec, then it could be beneficial for the media-coding selection device 740 to adopt a media-coding scheme that used less data, either by adopting another media-coding standard or by adapting the presently used media-coding standard to increase its information loss. Accordingly, while media quality might degrade, a receiving device would nonetheless still have a video signal for the user of the receiving device to enjoy.

It should be appreciated that there may be instances where a communications channel degrades beyond some threshold so as to make changing a presently used wireless channel to another wireless channel beneficial or necessary. In various instances, the change of wireless channel may be within a given wireless protocol (e.g., changing from 802.11 channel 2 to 802.11 channel 4) or a change to another protocol (e.g., changing from 802.11 to Bluetooth). In such instances, it may be beneficial or necessary to change media-coding for any of a number of reasons, such as the resultant change in data transfer capacity and/or the resultant change data transfer overhead, some aspect of the PHY or MAC layers supporting the different wireless protocols and so on.

Additional to the ability of the exemplary media-coding selection device 740 to dynamically select media-coding based on changing conditions, in various embodiments the exemplary media-coding selection device 740 may be enabled to apply "differential media-coding." That is, it may be beneficial for the exemplary media-coding selection device 740 to apply different media-coding to different portions of an outgoing stream of data.

For example, assuming that an NAL media-coding standard is used, it may be beneficial for the media-coding selection device 740 to cause a media-coding device to apply a first NAL coding with no information loss for areas in the middle of a display while applying a second NAL coding having substantial information loss for areas at the perimeter of the same display.

Similarly, information loss may be divided based on type of frame or slice, as opposed to the spatial location of the relevant information. For example, assuming that an MPEG-2 media-coding standard is used, it may be beneficial for the media-coding selection device 740 to cause a media-coding device to apply a first (non-lossy) MPEG-2 coding for I-frames, but apply a second (lossy) MPEG-2 coding to P-frames.

In view of the various complexities of communications channels and those benefits that may be derived by providing the best possible media quality to a receiving device, it may be beneficial in various embodiments for the media-coding selection device 740 to select media-coding as a function of PHY and MAC layer considerations. For example, in instances where inner-coding may need to be increased, it may be beneficial for the media-coding selection device 740 to select a media-coding scheme that uses less data transfer overhead in lieu of the increased data transfer overhead used by the enhanced inner-coding. Similarly, in instances where outer-coding may decrease without detriment, it may be feasible for the media-coding selection device 740 to select a media-coding scheme that uses greater data transfer overhead that might otherwise be wasted.

Accordingly, in various embodiments, the selections of the media-coding selection device 740, as well as the selections of the remaining devices 742, 744, 746 and 748, may be subject to some form of joint optimization provided by the exemplary joint optimization device 750. Generally, it may be feasible for joint optimization to take into account any combination of media-coding, error-coding, data compression, communication channel protocol and other relevant considerations. Thus, in various embodiments, the exemplary joint optimization device 750 may be made to operate according to any number of parametric equations, statistical analysis or other form of processing that may lead to a substantially maximum percentage of successfully transmitted data bits to a receiving apparatus, substantially maximum percentage of successfully transmitted video frames to a receiving apparatus or otherwise provide substantial improvement in media quality at a receiving apparatus. For example, the joint optimization device 750 may use an N-dimensional table with entries developed via simulation and experience, such that ranges of input parameters, such as channel data capacity, data transfer overhead capacity and signal-to-noise ratios, may produce a set of outputs, such as optimal media-coding, inner-coding, outer-coding and compression, that may be employed to forward media content.

Figure 8:
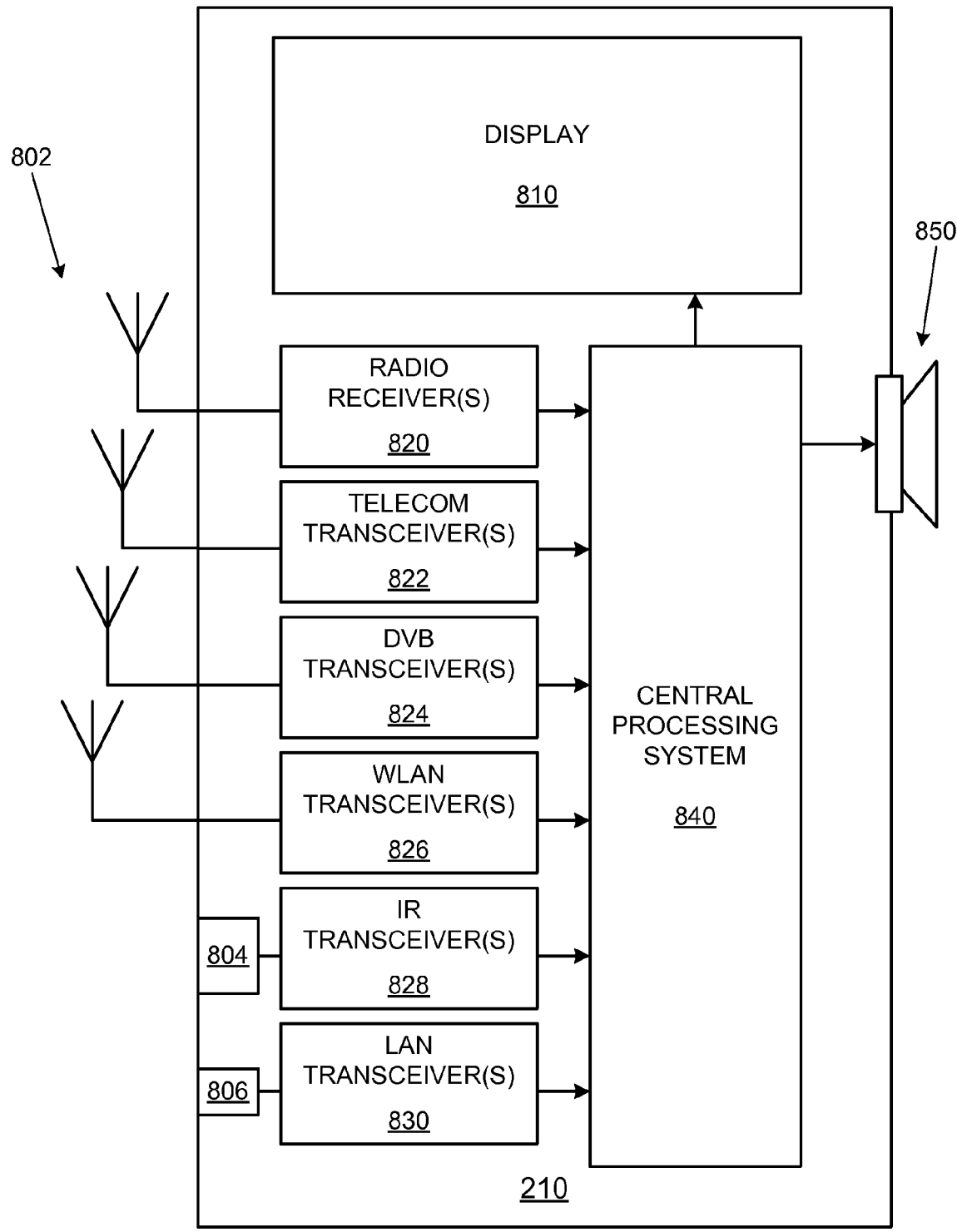
FIG. 8 shows details of the exemplary receiving device of FIG. 2.

FIG. 8 shows details of an exemplary receiving device 210 of FIG. 2. As shown in FIG. 8, the exemplary receiving device 210 includes a variety of input/output devices including a set of radio receivers 820, set of telecom transceivers 822, a set of DVB transceivers 824, a set of WLAN transceivers 826, a set of infrared (IR) transceivers 828, and a set of wired LAN transceivers 830. The various input/output devices 820-830 are serviced respectively by antennas 802, IR interface(s) 804 and electrical interface(s) 806. As with the exemplary first cellular telephone 150 of FIG. 3, the exemplary receiving device 210 further includes a central processing system 840, a user interface display 810 and speaker(s) 850, and in various embodiments, the various components 802-840 may individually work in manners similar to their counterparts 302-340 of FIG. 3.

Figure 9:
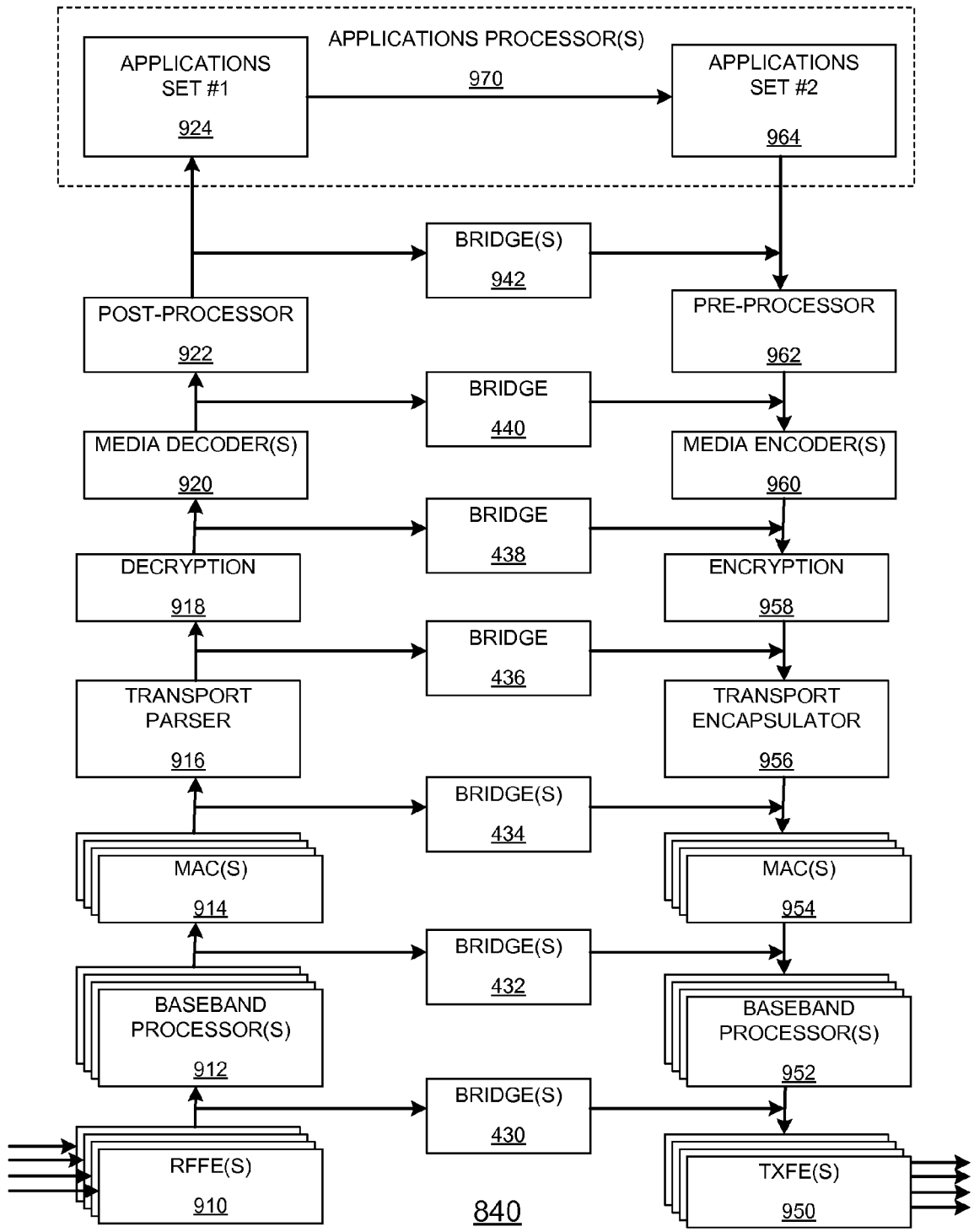
FIG. 9 shows details of the central processing system of FIG. 8.

FIG. 9 shows details of the central processing system 840 of FIG. 8. As with the central processing system 340 of FIG. 4, the instant central processing system 840 includes a set of RFFE(S) 910, a set of receiver baseband processors 912, a set of receiver Media Access Controllers (MACs) 914, a receiver transport parser 916, a decryption device 918, a set of media decoders 920, a post-processor 922 and a number of applications processors 970 containing a first set of applications 924 and a second set of applications 964. The exemplary central processing system 340 further includes a set of TXFE(S) 950, a set of transmitter baseband processors 952, a set of transmitter MACs 954, a transmitter transport parser 956, an encryption device 958, a set of media encoders 960, a pre-processor 962, and a series of data bridges 930-942 providing optional data paths from various receiver devices 910-922 and transmitter devices 950-962.

While the exemplary receiving device 210 of FIG. 8 with its exemplary central processing system 840 can perform a large variety of communications services, the present discussion is limited to descriptions involving media reception from an intermediate device, such as the first cellular telephone 150 of FIG. 2.

In operation, the RFFE(s) 910 may receive a media stream encoded according to any of the variants described above, including the dynamic and differential media-encoded streams, media streams using dynamic and differential error coding and so on. Generally, such media streams may be received and processed using the various receiver devices 910-922 to produce a processed media stream suitable for display and/or listening.

In order to correctly process the received media stream, the relevant coding information regarding media-coding, outer-coding, inner-coding, compression and encryption must be known or capable of being determined. Accordingly, in various embodiments the central processing system 840 may be configured at the applications level based on initial negotiations with a media content transmitting device. For example, in various embodiments, the first cellular telephone 150 and receiving device 210 of FIG. 2 can make an initial communication using default parameters. Subsequently, the receiving device 210 can pass information about the forward data communications channel, such as signal strength and SNR, as well as information regarding preferences and limitations of the receiving device 210, to the first cellular telephone 150. Accordingly, an appropriate regime of media-coding, error-coding, compression and so on, may be selected and implemented by both the first cellular telephone 150 and the receiving device 210.

For situations where dynamic coding is used, the information describing various coding changes may be encapsulated within a received stream of multimedia data. For example, for situations where changes of media-coding, inner-coding and outer-coding are made to a received stream of multimedia data, various embedded flags within the stream of multimedia data may be extracted by transport parser 916 and subsequently provided to the applications processor(s) 970 where coding selections may be made based upon the extracted flags.

Figure 10:
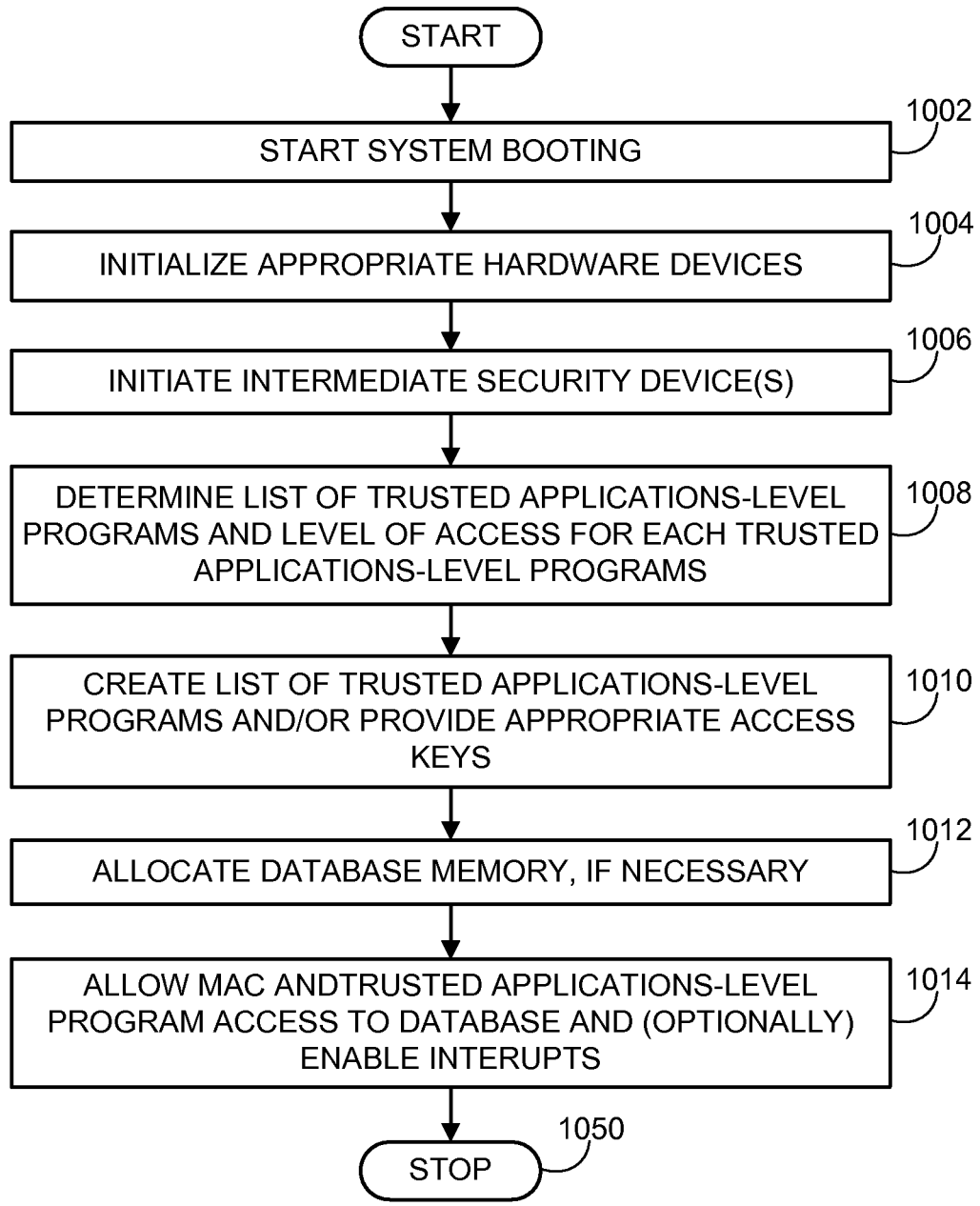
FIG. 10 is a flowchart outlining a number of first exemplary operations of the disclosed methods and systems.

FIG. 10 is a flowchart outlining a number of first exemplary operations of the disclosed methods and systems for initiating a secure multi-radio database, such as the database system depicted in FIGS. 5 and 6. The process starts in step 1002 where a system booting/initialization process is started. In various embodiments, such an initialization can be part of a general system initialization or part of a special "trusted booting operation." Next, in step 1004, a number of various hardware devices associated with the multi-radio database, such as control registers, DMAs, and interrupt controllers, may be initialized. Then, in step 1006, a number of intermediate security devices, such as the trusted agents 620 of FIG. 6, may be initiated. In various embodiments, such initialization may take the form of enabling electronic hardware, evoking a number of software routines, or some combination thereof. Control continues to step 1008.

In step 1008, a list of trusted applications-level programs may be determined, and in a variety of embodiments an optional list of the level of access each trusted applications-level programs may be given may also be determined. Next, in step 1010, a list of trusted applications-level programs may be compiled and/or software access keys provided to the trusted applications-level programs. Control continues to step 1012.

In step 1012, the appropriate memory may be allocated for the multi-radio database, if necessary, depending on the form of a particular embodiment. Next, in step 1014, the appropriate MACs and trusted applications-level programs may be allowed access to the multi-radio database, and various interrupts associated with the database, such as interrupts to the applications level signaling that a particular record or field has been updated, may be enabled. Control continues to step 1050 where the process stops.

Figure 11:
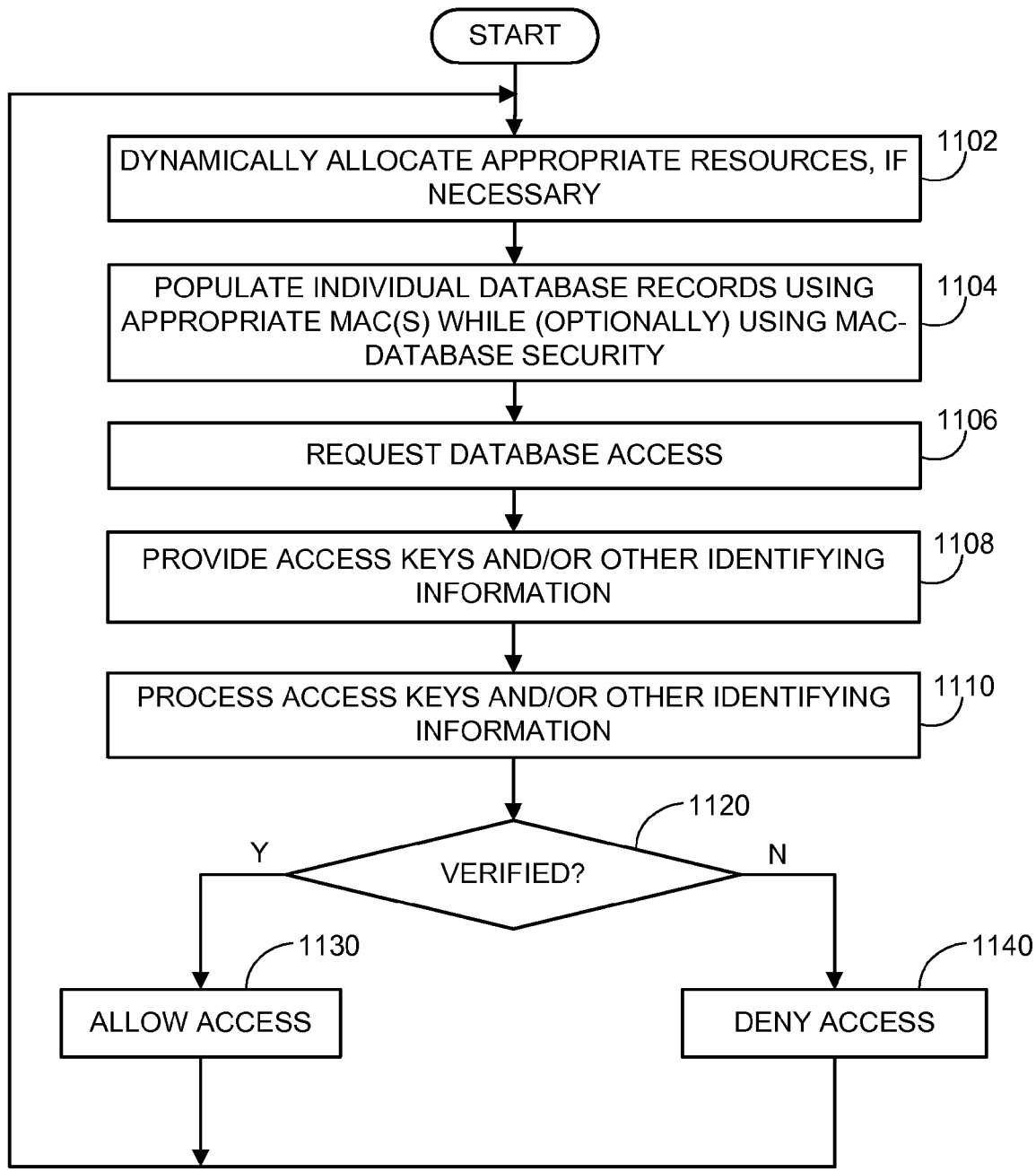
FIG. 11 is a flowchart outlining a number of second exemplary operations of the disclosed methods and systems.

FIG. 11 is a flowchart outlining a number of second exemplary operations of the disclosed methods and systems relating to the operation of a multi-radio database. Note that while steps 1102 and 1104 are depicted in series with steps 1106-1140, it should be appreciated that steps 1102 and 1104 may be somewhat independent of the remaining steps. For example, steps 1102 and 1104 may occur according to a strict period of 1 millisecond while the remaining steps 1106-1140 occur on an irregular and unrelated basis. However, steps 1102 and 1104 and 1106-1140 are combined into the flowchart of FIG. 11 in order to better describe the interactions between the groups of operations.

The process starts in step 1102 where the appropriate resources for a multi-radio database are dynamically allocated, in necessary. For example, should a particular wireless device be made available and a wireless channel enabled, an appropriate amount of memory sufficient to store parameters relating to the device and channel may be allocated, and some amount of DMA and interrupt resources optionally may be also be allocated for use with the new wireless device and channel. Next, in step 1104, various individual records and fields of the multi-radio database may be populated/updated by the appropriate MACs. Note that as mentioned above, there may be embodiments where various MACs may be provided access only to those records and fields with which they are associated in order to improve security and reduce the likelihood of accidental data corruption.

In step 1106, an applications-level program may request access to the multi-radio database via an intermediate device, such as a software-based agent. Next, in step 1108, the applications-level program may provide some form of access information, such as an access key and/or some other form of identification to the intermediate device. Control continues to step 1110.

In step 1110, the access key and/or other form of identification of step 1108 may be processed by the intermediate device using a list of trusted agents, a device for verifying access keys and so on. Next, in step 1120, a determination is made as to whether the access key and/or other form of identification is verified as belonging to a trusted applications-level program. If the access key/identification is verified, control jumps to step 1130 where database access is allowed; otherwise, control jumps to step 1140 where database access is denied. Control then jumps back to step 1102 where the various operations may be repeated as necessary or desired.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. In a variety of embodiments, a storage medium may represent one or more devices and/or other machine readable mediums for storing information. The term "machine readable medium" includes, but is not limited to wireless channels and various other mediums capable of storing, containing or carrying instruction(s) and/or data.

Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communications.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
a first database of channel performance information embedded on a machine-readable and writable medium, wherein the first database includes a plurality of records with each record containing information relating to a wireless channel monitored by one or more Media Access Controllers (MACs);
input circuitry configured to receive information from the one or more MACs monitoring respective wireless channels such that each record of the first database contains channel performance information for a respective wireless channel;
output circuitry configured to provide the channel performance information to a plurality of applications-level executable programs running on one or more computers; and
a security device that protects the first database from access by at least one unauthorized applications-level executable program,
wherein the input circuitry and the output circuitry are configured to exchange information between a MAC level and an applications level without requiring a use of intermediate level devices.

2. The apparatus of claim 1, wherein each record includes at least a first field containing at least one of the following for a particular communications channel: a communications channel identifier, an available data bandwidth, an error rate, an availability indicator, an average back-off time, a latency indicator, an indicator of a number of retransmissions, and a channel protocol indicator.

3. The apparatus of claim 2, wherein the security device includes a trusted list of applications-level executable programs authorized to access the first database.

4. The apparatus of claim 2, wherein the security device includes at least one on a trusted list of applications-level executable programs authorized to access the first database and a set of trusted keys for enabling applications-level executable programs to access the first database.

5. The apparatus of claim 4, wherein the security device includes an intermediate access software agent.

6. The apparatus of claim 4, wherein at least one of the trusted list and the set of trusted keys are established during a re-boot operation of the apparatus.

7. The apparatus of claim 2, wherein data in the first database is protected from write access by applications-level executable programs.

8. The apparatus of claim 2, wherein at least a first record of the first database is protected from write access by the one or more MACs that are not used to derive channel performance information associated with the first record.

9. The apparatus of claim 8, wherein all records of the first database are protected from write access by the one or more MACs that are not used to derive related channel performance information.

10. The apparatus of claim 2, wherein the security device is configured to pass information to at least one applications-level executable program to indicate that a particular record in the first database has been updated.

11. The apparatus of claim 10, wherein the first database uses a data path between a first integrated circuit and a second integrated circuit, the data path comprising a single data line.

12. The apparatus of claim 11, wherein the single data line is configured to pass a serial data stream.

13. The apparatus of claim 2, wherein each record of the first database further includes a second field containing at least one of the following for a particular communications channel: an available data bandwidth, a channel error rate, an availability indicator, an average backoff time, a latency indicator, an indicator of a number of retransmissions, a channel signal strength, and a channel protocol indicator.

14. The apparatus of claim 2, wherein each record of the first database further includes a second field containing an available data bandwidth, a third field containing a channel error rate, a fourth field containing an availability indicator, a fifth field containing an average back-off time, a sixth field containing a latency indicator, a seventh field containing an indicator of a number of retransmissions, an eighth field containing a channel signal strength, and a ninth field containing a channel protocol indicator.

15. The apparatus of claim 2, wherein the first database of channel performance information comprises a memory that is dynamically allocated.

16. The apparatus of claim 2, wherein the first database of channel performance comprises a memory that is allocated at only during a booting condition.

17. The apparatus of claim 2, wherein the apparatus comprises a cell phone.

18. The apparatus of claim 2, wherein the apparatus is incorporated with one or more integrated circuits.

19. An apparatus, comprising:
storing means for storing a first database of channel performance information, wherein the first database includes a plurality of records with each record containing information relating to a wireless channel monitored by one or more Media Access Controllers (MACs);
input means for receiving information from the one or more MACs monitoring respective wireless channels such that each record of the first database contains channel performance information for a respective wireless channel;
output means for providing the channel performance information to a plurality of applications-level executable programs running on one or more computers; and
security means for protecting the storing means from access by at least one unauthorized applications-level executable program,
wherein the input means and the output means are configured to exchange information between a MAC level and an applications level without requiring a use of intermediate level devices.

20. The apparatus of claim 19, wherein each record includes at least a first field containing at least one of the following for a particular communications channel: a communications channel identifier, an available data bandwidth, an error rate, an availability indicator, an average backoff time, a latency indicator, an indicator of a number of retransmissions, and a protocol indicator.

21. The apparatus of claim 20, wherein each record of the storing means further includes a second field containing an available data bandwidth, a third field containing a channel error rate, a fourth field containing an availability indicator, a fifth field containing an average back-off time, a sixth field containing a latency indicator, a seventh field containing an indicator of a number of retransmissions, an eighth field containing a channel signal strength, and a ninth field containing a channel protocol indicator.

22. The apparatus of claim 20, wherein the security means includes a set of trusted keys for enabling applications-level executable programs to access the first database.

23. The apparatus of claim 20, wherein the security means includes at least one on a trusted list of applications-level executable programs authorized to access the first database and a set of trusted keys for enabling applications-level executable programs to access the first database.

24. The apparatus of claim 23, wherein the security means includes an intermediate access software agent.

25. The apparatus of claim 24, wherein at least one of the trusted list and set of trusted keys are established during a re-boot operation of the apparatus.

26. The apparatus of claim 20, wherein the first database of channel performance information comprises a memory that is dynamically allocated.

27. The apparatus of claim 20, wherein the first database of channel performance comprises a memory that is allocated at only during a booting condition.

28. A method for use in a communication system employing a plurality of different communication channels, comprising:
    establishing a first database of channel performance information, wherein the first database includes a plurality of records with each record containing information relating to a wireless channel monitored by a Media Access Controller (MAC);
    receiving information from a plurality of MACs monitoring respective wireless channels such that each record of the first database contains channel performance information for a respective wireless channel;
    providing the channel performance information to a plurality of applications-level executable programs running on one or more computers while protecting the first database from access by at least one unauthorized applications-level executable program; and
    exchanging information between a MAC level and an applications level without requiring a use of intermediate level devices.

29. The method of claim 28, wherein each record includes at least a first field containing at least one of the following for a particular communications channel: a communications channel identifier, an available data bandwidth, an error rate, an availability indicator, an average backoff time, a latency indicator, an indicator of a number of retransmissions, and a protocol indicator.

30. The method of claim 29, wherein each record of the first database further includes a second field containing an available data bandwidth, a third field containing a channel error rate, a fourth field containing an availability indicator, a fifth field containing an average back-off time, a sixth field containing a latency indicator, a seventh field containing an indicator of a number of retransmissions, an eighth field containing a channel signal strength, and a ninth field containing a channel protocol indicator.

31. The method of claim 29, wherein the protecting comprises using at least one on a trusted list of applications-level executable programs authorized to access the first database and a set of trusted keys for enabling applications-level executable programs to access the first database.

32. The method of claim 29, wherein the protecting comprises using both a trusted list of applications-level executable programs authorized to access the first database and a set of trusted keys for enabling applications-level executable programs to access the first database.

33. The method of claim 29, wherein the protecting comprises activating an intermediate access software agent for providing an interface between applications-level executable programs and the first database.

34. The method of claim 33, wherein at least one of the trusted list and set of trusted keys are established during a re-boot operation of the apparatus.

35. The method of claim 33, further comprising allocating a memory for the first database.

36. The method of claim 35, wherein the memory in the first database of channel performance information is dynamically allocated.

37. The method of claim 35, wherein the memory in the first database of channel performance is allocated at only during a booting condition.

38. A communication apparatus for providing robust communications, comprising:
    a set of one or more processors; and
    one of more computer-readable memories coupled to the set of one or more processors containing a plurality of instructions for causing the set of one or more processors to execute:
    establishing a first database of channel performance information, wherein the first database includes a plurality of records with each record containing information relating to a wireless channel monitored by a Media Access Controller (MAC);
    receiving information from a plurality of MACs monitoring respective wireless channels such that each record of the first database contains channel performance information for a respective wireless channel;
    providing the channel performance information to a plurality of applications-level executable programs running on one or more computers while protecting the first database from access by at least one unauthorized applications-level executable program; and
    exchanging information between a MAC level and an applications level without requiring a use of intermediate level devices.

39. A computer program product, comprising:
    a non-transitory computer-readable medium comprising:
    a first set of one or more instructions for establishing a first database of channel performance information, wherein the first database includes a plurality of records with each record containing information relating to a wireless channel monitored by a Media Access Controller (MAC);
    a second set of one or more instructions for receiving information from a plurality of MACs monitoring respective wireless channels such that each record of the first database contains channel performance information for a respective wireless channel;
    a third set of one or more instructions for providing the channel performance information to a plurality of applications-level executable programs running on one or more computers while protecting the first database from access by at least one unauthorized applications-level executable program; and
    a fourth set of one or more instructions to exchange information between a MAC level and an applications level without requiring a use of intermediate level devices.

* * * * *